April 17, 1962

E. J. DI IANNI 3,030,539

GEIGER-MULLER TUBE WITH LOW GAMMA TO
BETA OR ALPHA RESPONSE RATIO

Filed Sept. 25, 1959

INVENTOR:
ELMO J. DI IANNI
BY
Max D. Farmer
ATTORNEYS:

April 17, 1962

E. J. DI IANNI 3,030,539

GEIGER-MULLER TUBE WITH LOW GAMMA TO
BETA OR ALPHA RESPONSE RATIO

Filed Sept. 25, 1959

INVENTOR:
ELMO J. DI IANNI

BY

ATTORNEYS:

United States Patent Office 3,030,539
Patented Apr. 17, 1962

3,030,539
GEIGER-MULLER TUBE WITH LOW GAMMA TO BETA OR ALPHA RESPONSE RATIO
Elmo J. Di Ianni, Floral Park, N.Y.
(26 Howell Road, Mountain Lakes, N.J.)
Filed Sept. 25, 1959, Ser. No. 842,537
6 Claims. (Cl. 313—93)
(Granted under Title 35, U.S. Code (1952), sec. 266)

The invention described herein may be manufactured and used by or for the Government of the United States of America for governmental purposes without the payment of any royalties thereon or therefor.

This invention relates in general to Geiger-Muller counter tubes employed for the measurement of radioactive radiation, and more particularly to the design of a G-M (Geiger-Muller) counter tube exhibiting a low gamma to beta or alpha radiation response ratio.

With the advent of nuclear reactors it has become increasingly necessary to count or measure beta and alpha activity in the presence of high gamma radiation or high background radiation such as natural background, as for example, aboard nuclear powered surface vessels. Present G-M counter tubes unless modified cannot be employed to measure beta radiation in the presence of a gamma field since the counter tube cannot inherently distinguish or separate the counts produced by various forms of radiation. Various methods of adapting G-M tubes for this purpose have been suggested but these methods have been found to be unsatisfactory in one or more respects. Lengthwise shielding of the G-M tube with a thick lead or other heavy metal to prevent the penetration of gamma radiation into the tube except through a window presents several disadvantages. The shield substantially increases the size and weight of the tube and further, shields of this type are inherently inefficient when compared to their cost. Reduction in gamma radiation response can also be attained by utilizing detecting devices or elements other than G-M tubes, as for example, proportional counters or scintillation phosphors. These techniques increase the cost and also reduce the beta radiation response in addition to requiring supplementary complex electronic components and systems.

An object of this invention is to provide a radiation counter having a low gamma to beta or alpha radiation response ratio.

Another object is to provide a directional radiation detector having a low gamma to beta or alpha radiation response ratio.

A further object is to provide an electrically and mechanically, simple, efficient, inexpensive device for the detection of beta or alpha radiation in the presence of gamma and other background radiation.

Other objects and advantages will be apparent from the following description of some embodiments of the invention and the novel features thereof will be particularly pointed out hereinafter in connection with the appended claims.

Figure 1:
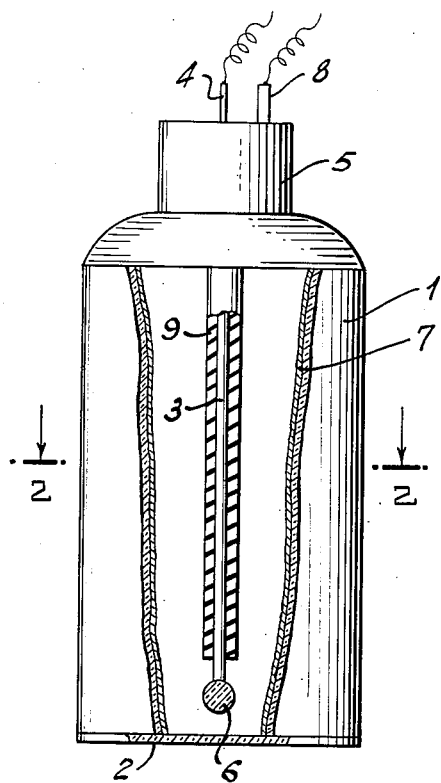
FIG. 1 is a front elevation partly in section of one embodiment made in accordance with this invention.

In the embodiment of the invention illustrated in FIG. 1, a cylindrical glass envelope 1 or an envelope of any suitable material open at one end has a mica window 2 sealing such open end of the envelope 1. Though mica has been used successfully for the end window of radiation tubes, any material such as polyester films, one of which is marketed by Du Pont Co. under the trademark "Mylar," or a light, thin metal may be suitable provided, it is penetrable by beta and alpha radiation and can be sealed to the envelope. The sealed, closed envelope 1 contains a halogen or organic quenching gas filling, a metallic wire-like anode 3 extending lengthwise of the tube, passing through one end of the envelope, sealed thereto and then extending beyond the base where it is electrically connected to pin 4 of the tube base 5. The free end of the anode 3 extends in a direction toward the end window 2 terminating in proximity to the window. A glass or ceramic bead 6 is provided on the free or tip end of the anode in order to prevent any electrical discharge or breakdown between the end of the anode and any surface spaced therefrom but in proximity thereto. Coaxial with the anode and extending for approximately the same length, and disposed within the envelope is a metallic cathode 7. As has been found satisfactory the cathode may be a thin metallic layer coated on the inner surface of the envelope or a physically separate cathode structure supported within the envelope and electrically connected to another pin 8 on the base 5. It would be preferable though not essential to employ a light or low atomic weight metal as the cathode in order to reduce the secondary emission of electrons from the cathode when gamma radiation impinges upon the outer surface of the cathode. An electrically insulating sleeve 9 completely surrounds and covers the anode outer surface with the exception of a small lower portion of the anode which is in proximity of the window 2 so as to expose only that small lower portion of the anode to the cathode. The sleeve 9 extends lengthwise and coaxial with the anode and supported thereon, starting from that portion of the anode that is sealed to and passes through the envelope. Satisfactory results have been obtained using glass or ceramic sleeves and further, insulating material deposited or coated on the anode may be employed provided their dielectric properties are sufficient to withstand the high anode voltage.

Figure 2:
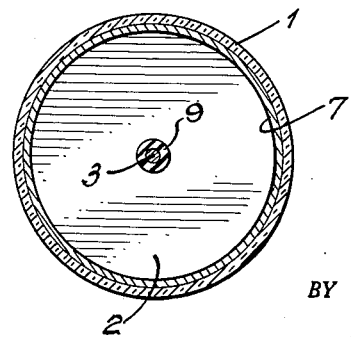
FIG. 2 is a cross-sectional plan approximately along the line 2—2 of FIG. 1.

FIG. 2 clearly illustrates the physical relationships among the various components of this embodiment, namely, the coaxial relationship between the cathode and the anode and the anode and the sleeve. Though this coaxial relationship may be modified and other configurations successfully employed, the ease of manufacture and handling dictate the use of the illustrated structure.

Counter tubes of the Geiger-Muller type are sensitive to various forms of radioactive radiation, as for example, alpha, beta and gamma radiation or other penetrating radiation. When gamma radiation impinges upon any portion of the metallic cathode a probability exists that an electron will be ejected from the cathode and accelerated toward the anode under the action of a strong electric field created by the impression of a large D.C. potential between the anode and cathode supplied by an external power supply connected to the anode and cathode. The ejected electron produces secondary ionization within the gas filled counter tube which in turn leads to an avalanche at the anode thereby producing a count in the tube. Beta or alpha radiation which enters the tube only through the end window since it cannot penetrate the metallic cathode, ionizes the gas directly to produce a count. For a beta or alpha particle entering the tube the probability of producing a count is very nearly one and the particle itself travels only a short distance (1 or 2 mean free paths) before sufficient ionization occurs to produce a count. It can therefore be seen that it would be impossible without external complex circuitry, to determine whether any particular count was the result of gamma radiation as opposed to either alpha or beta radiation.

Referring now to the counting or operation of the embodiment illustrated in FIG. 1, wherein the electric field between the anode and cathode is substantially altered, the sleeve 9 reduces this electric field in all parts of the tube except in that portion where the anode and cathode are exposed to each other, namely, in proximity of the end window 2 where the beta and alpha radiation must enter in order to produce a count. Counts in the tube will be produced only by ionization occurring within the small portion of the tube near the end window. Since in a conventional G-M counter tube beta or alpha counts can only be produced by radiation entering through the end window, the tube counter illustrated in FIG. 1 will not substantially alter the beta and alpha response as compared to a conventional tube. The tube counts due to gamma or penetrating radiation will, however, be substantially reduced since the surface area over which the radiation may impinge to produce a count has been greatly reduced by the reduction or elimination of the necessary accelerating potential required, over the greater portion of the anode. It can therefore be readily seen that the ratio of gamma to beta or alpha response is quite low and that the ratio may be altered or varied in any predetermined manner by the length of the sleeve or the length of the anode left exposed. Operationally successful counter tubes have been constructed with only ⅛ of an inch of the anode exposed and with this form of construction, it is good practice to also reduce the diameter of the bead to an operating minimum in order to maintain an efficiently operating counter tube.

Figure 3:
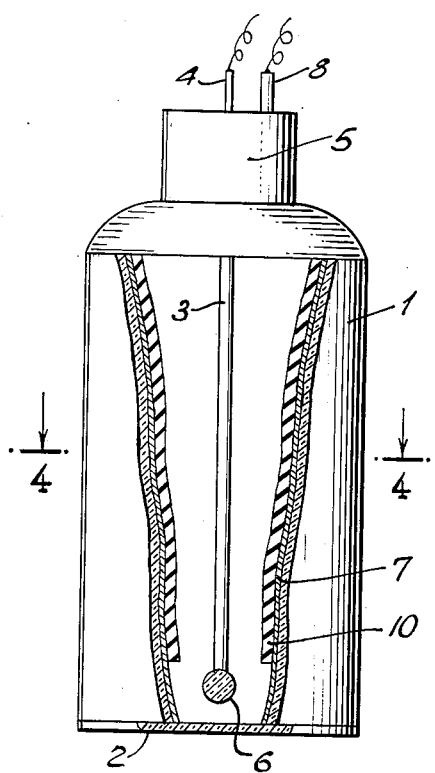
FIG. 3 is a front elevation partly in section of another embodiment made in accordance with this invention.
Figure 4:
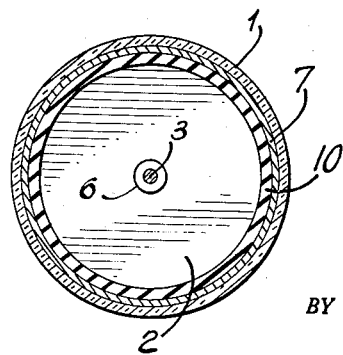
FIG. 4 is a cross-sectional plan approximately along the line 4—4 of FIG. 3.

Another embodiment of this invention is illustrated is FIGS. 3 and 4, wherein the tube elements are substantially similar to those described in connection with FIGS. 1 and 2 and are similarly numbered with the exception of the electrically insulating sleeve 10. The sleeve 10 of the embodiment illustrated in FIGS. 3 and 4 is cylindrical, disposed with its outer surface in abutting relationship to the inner surface of the cathode 7 and the inner sleeve surface spaced from and face to face with the anode 3 so as to be positioned between the inner surface of the cathode and the anode. The sleeve extends lengthwise of the anode starting at the upper end portion of the envelope near the tube base 5 supported thereon or in any suitable manner and terminating in proximity of the end window 2 thereby leaving only a small portion of the cathode exposed to the anode in the region of the end window 2. The sleeve 10, of this embodiment as was the case in the previously described and illustrated embodiment, may be deposited or sprayed on the cathode inner surface. The counting operation of this embodiment is substantially similar to that of the previously described embodiment and further description is unnecessary.

The ease of fabrication of either described embodiment due in part to the simplicity of the counter tube of this invention materially reduces the cost and increases the overall efficiency of operation without the addition of accessories or complex electronic circuitry.

It will be understood that various other changes in the details, materials and the arrangement of parts which have been herein described and illustrated in order to explain the nature of this invention, may be made by those skilled in the art within the principle and scope of the invention as expressed in the appended claims.

I claim:

1. A radiation counter of the Geiger-Muller type for the detection of low level beta or alpha activity which may exist coincident with and in the presence of gamma or extraneous background radiation, comprising an envelope open at one end, a window penetrable by beta radiation sealing said open end, said envelope containing a gas filling and having thereon a cathode, an anode coaxial with said cathode, one end of said anode extending through and beyond a wall of said envelope remote from said window and sealed thereto, the opposite free end of said anode extending in a direction toward said window and in proximity therewith, an electrical insulator interposed between said anode and said cathode and extending lengthwise of the anode but leaving only a small fraction of an end portion of the anode and cathode surfaces exposed to each other in the immediate vicinity of said window whereby said beta activity entering the counter through said window may activate said G-M counter while gamma or extraneous radiation activation within said counter is substantially reduced.

2. A radiation counter of the Geiger-Muller type for the detection of low level beta or alpha activity which may exist coincident with and in the presence of gamma or extraneous background radiation, comprising a gas-filled, closed envelope having a window wall of a material penetrable by rays emitted by radioactive substances, an anode and cathode within said envelope, spaced apart and coaxial with one another, extending toward said window wall from and through, and sealed to a part of the envelope remote from said window wall, and terminating in free ends in proximity to said window wall but spaced therefrom a distance sufficient to prevent formation of a corona between the anode end and the window wall, an electrical insulator disposed within said envelope between the anode and cathode from their support by the envelope toward said window wall but terminating short of the free end of said anode by a small fraction of an inch, leaving an exposed free end portion of said anode relatively remote from the nearest part of the cathode to which ionization of the gas is largely restricted and counts in the tube from gamma and background radiation will be reduced without significantly reducing the response to beta and alpha radiation.

3. The radiation counter according to claim 1 wherein said one end of said anode extends through and beyond the wall of said envelope remote from said window.

4. The radiation counter according to claim 1 wherein said electrical insulator is disposed adjacent said anode, surrounds said anode and extends lengthwise of said anode terminating short of the free end of said anode in proximity of said window.

5. The radiation counter according to claim 1 wherein said electrical insulator is disposed adjacent the cathode surface facing said anode and extending lengthwise of said cathode terminating short of the end of the cathode in proximity of said window.

6. The radiation counter according to claim 1 wherein said window is of an electrically insulating material.

References Cited in the file of this patent

UNITED STATES PATENTS

| | | |
|---|---|---|
| 2,452,524 | Metten | Oct. 26, 1948 |
| 2,505,919 | Simpson | May 2, 1950 |
| 2,612,615 | Fehr et al. | Sept. 30, 1952 |
| 2,921,217 | Chubb | Jan. 12, 1960 |

OTHER REFERENCES

Theory and Operation of Geiger-Muller Counters, II by Brown, Nucleonics, August 1948, pages 50 to 64.